May 24, 1938.　　　H. M. ALEXANDER　　　2,118,131

DISPLAY APPARATUS

Filed Aug. 3, 1936

Inventor
HAROLD M. ALEXANDER
By Frank Fraser
Attorney

Patented May 24, 1938

2,118,131

UNITED STATES PATENT OFFICE 2,118,131

DISPLAY APPARATUS

Harold M. Alexander, Toledo, Ohio, assignor to Libbey-Owens-Ford Glass Company, Toledo, Ohio, a corporation of Ohio Application August 3, 1936, Serial No. 94,038

2 Claims. (Cl. 40—130)

The present invention relates to display apparatus broadly and more particularly to a novel type of display booth, window, or the like.

The primary object of the invention is the provision of an illuminated display booth or window, in which the article to be displayed is placed and which comprises mirrors arranged in such a manner and of such character that a multiplicity of reflections of the article on display are obtained so that an observer instead of seeing only one article is given the impression of viewing a large number of similar articles. There is thus provided a display of exceptionally attractive and unusual appearance.

Other objects and advantages of the invention will become more apparent during the course of the following description when taken in connection with the accompanying drawing.

Figure 1:
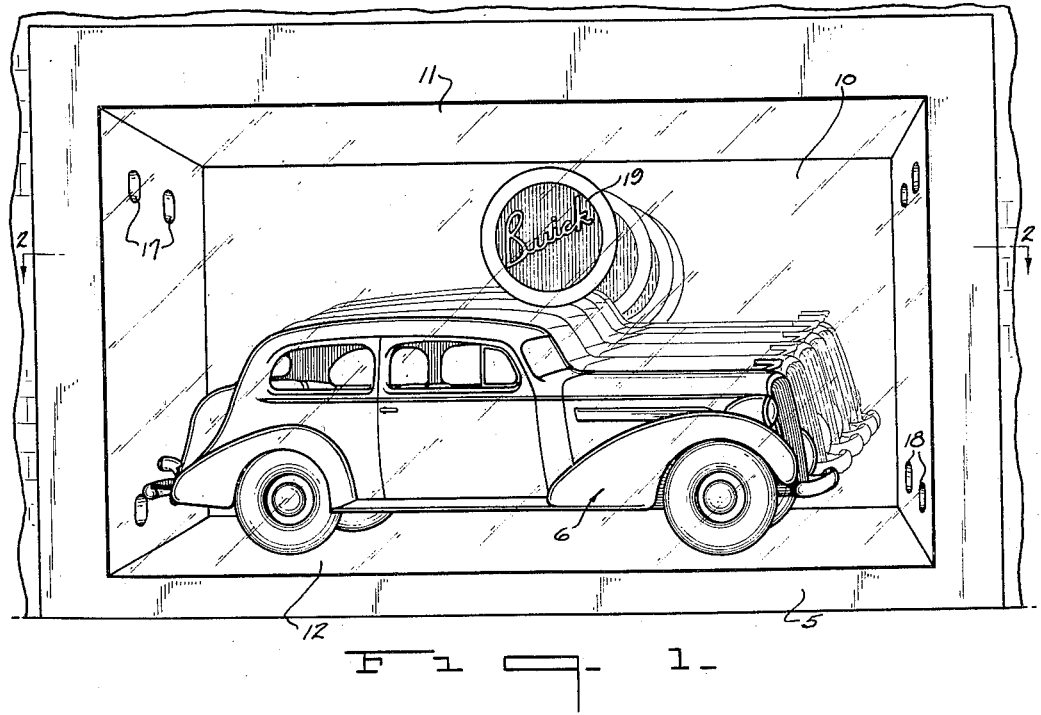
Figure 2:
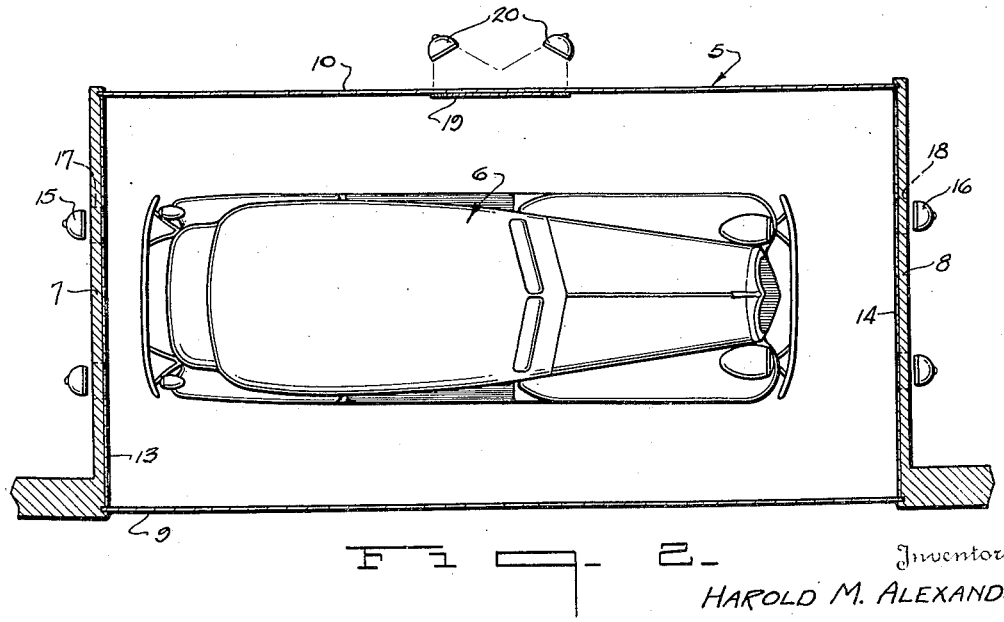

In the drawing wherein like numerals are employed to designate like parts throughout the same, Fig. 1 is a front elevation of a display apparatus provided by the invention, and Fig. 2 is a horizontal section taken substantially on line 2—2 of Fig. 1.

With reference to the drawing, the novel display window or booth is designated in its entirety by the numeral 5, while 6 represents the article on display and which consists in the present instance of an automobile, although any other article may of course be used. Also, if desired, a number of articles can be displayed.

The display window or booth 5 is preferably substantially rectangular and comprises the spaced vertical side walls 7 and 8, front and rear walls 9 and 10 respectively, top wall or ceiling 11, and the bottom wall or floor 12. The rear wall 10 preferably consists of an ordinary opaque glass mirror so arranged that the light reflecting surface thereof is disposed inwardly. It is, however, not absolutely necessary that the rear wall be of glass provided that it is opaque and has an inner light reflecting surface. The front wall 9 consists of a transparent glass mirror of any conventional or preferred type. By the term "transparent mirror" is meant a mirror which is transparent to an observer when the space behind the mirror is illuminated but which is more or less opaque to the observer when the space behind the mirror is not illuminated.

The side walls 7 and 8 may be of any desired material and the inner surfaces thereof may be painted or provided with facings 13 and 14 preferably of glass and either plain or silvered. When mirrors are used for facing the side walls, the light reflecting surfaces thereof are of course placed to the inside. Likewise, the inner surfaces of the top and bottom walls 11 and 12 may be either painted or faced with glass or other suitable material.

The interior of the display booth or window 5 and consequently the article 6 on display is adapted to be illuminated and the means for this purpose may take any one of a variety of different forms. As here shown, by way of example only, the interior of the booth or window is illuminated by a plurality of electric lamps 15 and 16 positioned outwardly of the side walls 7 and 8 respectively and the light from which is directed through openings 17 and 18 in said side walls preferably adjacent the top and bottom of the said window or booth.

As brought out above, when the interior of the display booth or window is not illuminated, the transparent mirror 9 is relatively opaque so that an observer standing in front of the booth or window does not see the article on display. However, as soon as the interior of the booth or window is illuminated, the mirror 9 immediately becomes transparent so that the article on display can be clearly seen. Due to the arrangement of the mirrors 9 and 10, a multiplicity of reflections of the article positioned therebetween will be obtained so that the observer will be given the impression of viewing a large number of articles rather than a single article. Although the front mirror 9 is rendered transparent to the observer when the interior of the booth or window is illuminated, this does not affect its light reflecting properties so that it will function the same as though it were opaque.

With such an arrangement, the article on display is reflected first in one mirror and then the other, with the result that a large number of articles will be seen by the observer reflected in the rear opaque mirror 10 as indicated in Fig. 1 of the drawing. In other words, when displaying an automobile for instance, a long file of automobiles will be seen in the mirror 10 and if mirrors are used for facing the side walls 7 and 8, long files of automobiles will also be seen at either side of those reflected in the rear mirror 10. In this way, the observer is given the impression of seeing a large number of automobiles which renders the display not only attractive but also unusual. Especially is this true when the lights used for illuminating the interior of the window or booth are flashed off and on periodically since, while during the time the lights are off, the display may be invisible to the observer, it immediately becomes fully visible when the lights are turned on. The attractiveness of the display can also be accentuated by the use of colored lights.

If it is desired to also place a sign or lettering against or upon the rear wall 10, that portion of the wall directly behind the sign or lettering is made transparent. For instance, a sign 19 bearing the word "Buick" is here shown as secured to the inner surface of the rear wall 10, and disposed in back of the wall and adapted to illuminate the sign are electric lamps 20 or any other suitable illuminating apparatus. When the sign is illuminated, it is reflected first in the transparent mirror 9 and then in the rear mirror 10, and this reflection continues from one mirror to the other with the result that a long file of signs are seen by the observer in the rear mirror as shown in Fig. 1 and are fully visible when the display is viewed through the front transparent mirror 9.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a display window, booth, or the like, spaced front and rear walls between which the article to be displayed is positioned, the rear wall being opaque and having an inner light reflecting surface while the front wall comprises a transparent mirror, means for illuminating the space between said walls, a portion of the rear wall being transparent, a sign mounted in front of said transparent portion, and means for illuminating the sign from the rear to cause it to be reflected back and forth in the front and rear walls.

2. In a display window, booth, or the like, spaced front and rear and side walls between which the article to be displayed is positioned, the rear wall and side walls being opaque and having inner light reflecting surfaces while the front wall comprises a transparent mirror, means for illuminating the space between said walls, a portion of the rear wall being transparent, a sign mounted in front of said transparent portion, and means for illuminating the sign from the rear to cause it to be reflected back and forth in the front and rear walls.

HAROLD M. ALEXANDER.